(No Model.)
H. ORPEN.
TYPE WRITING MACHINE.
No. 279,790. Patented June 19, 1883.
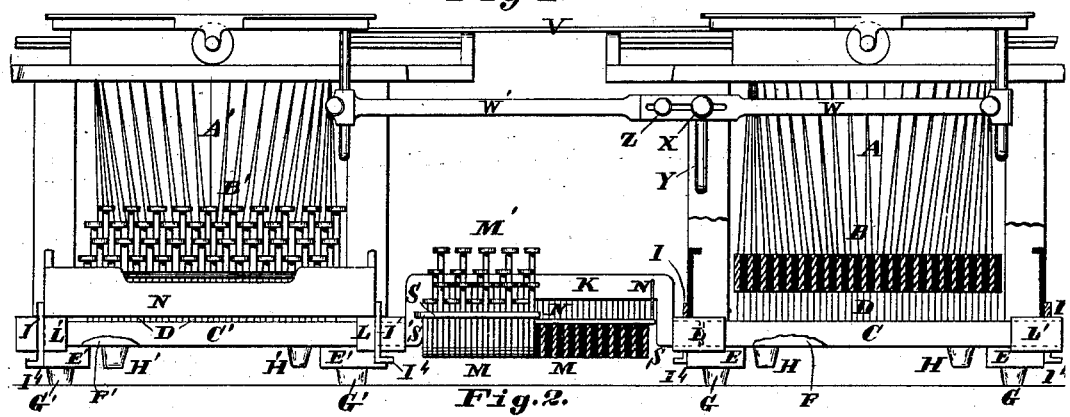
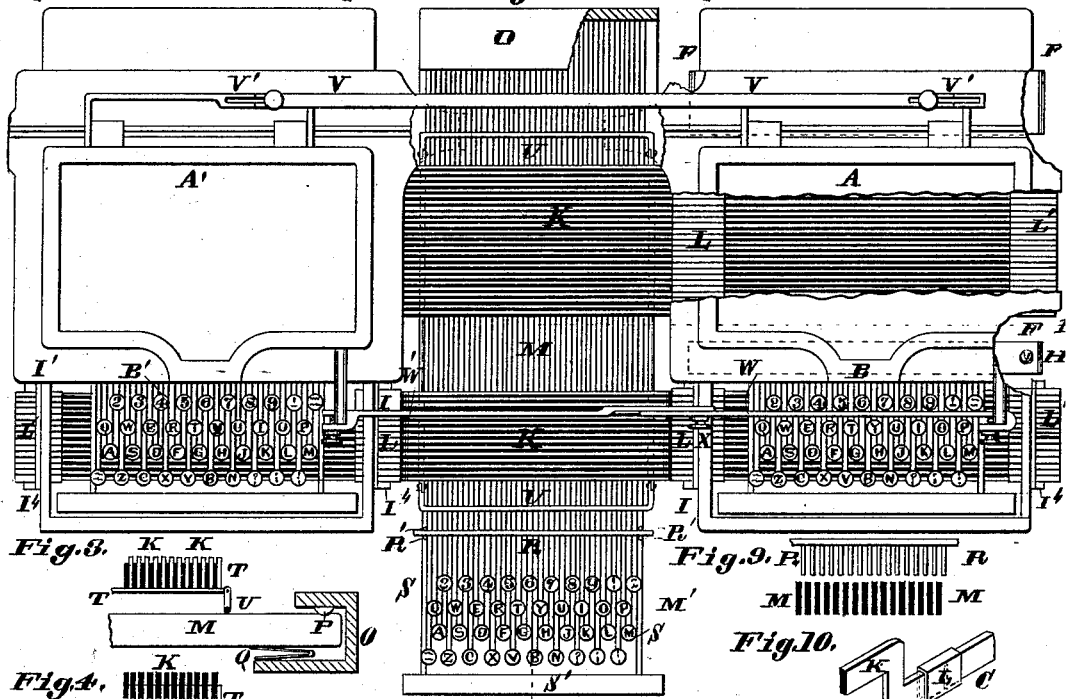
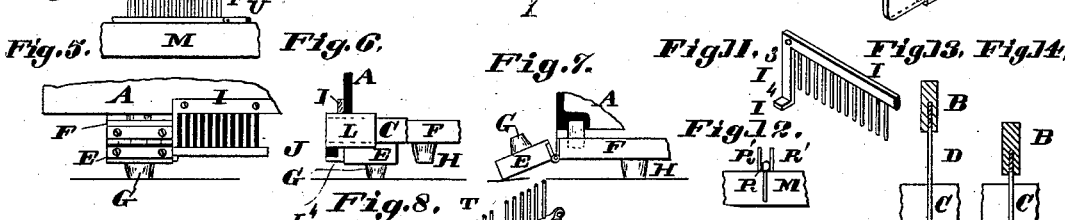
Attest.
Charles Pickles
Wm. J. Sayers
Inventor:
Henry Orpen
By Knight Bro
Attys.

UNITED STATES PATENT OFFICE.

HENRY ORPEN, OF ST. LOUIS, MISSOURI.

TYPE-WRITING MACHINE.

SPECIFICATION forming part of Letters Patent No. 279,790, dated June 19, 1883.

Application filed December 22, 1882. (No model.)

*To all whom it may concern:*

Be it known that I, HENRY ORPEN, of the city of St. Louis, in the State of Missouri, have invented a certain new and useful Improvement in Type-Writing Machines, of which the following is a full, clear, and exact description, reference being had to the accompanying drawings, forming part of this specification, and in which—
Figure 1 is part in front elevation and part in vertical section taken on line 1 1, Fig. 2. Fig. 2 is a top view with parts broken away. Figs. 3, 4, 5, 6, 7, 8, 9, 10, 11, 12, 13, and 14 are detail enlarged views illustrating different parts hereinafter described.

My invention is shown as applied to the Remington type-writing machines; but it may be applied to others.

My invention consists, broadly, in a plurality of machines connected to a single set of supplemental keys, so that all the machines thus connected can be operated at the same time by one person from a single set of keys for the purpose of producing duplicate or facsimile manuscripts.

Referring to the drawings, A A' represent two type-writing machines of common construction, the keys B B' of which are connected to transverse bars C C', respectively, a bar for each key, the connection being made by means of long light bolts D, (see Figs. 13 and 14,) which pass freely through the transverse bars and screw into the bottoms of the keys, and with heads on their lower ends, as shown in said figures. The transverse bars are beneath the machines, so that the machines have to be raised to allow room for them and permit of their necessary vertical movement. This is done by means of blocks E E', hinged to the corners of the base-plates F F' of the machines, (see Figs. 1, 5, 6, and 7,) and having rubber or other projections or feet, G G'. When the type-writers are connected these blocks are turned under the base-boards, as shown in Figs. 1, 5, and 6, and when they are disconnected, so as to be used separately, these blocks are turned out, as shown in Fig. 7, so as to bring the machine down to the usual height.

H H' represent the usual rubber feet or projections beneath the base-plates F F'. The transverse bars C C' are held in place laterally by combs I I', secured to the sides of the machine, the teeth of which project downward between the bars. On each end of each comb is an elongated large tooth, $I^3$, which has an out-turned lower end, $I^4$. (See Figs. 1, 2, 6, and 11.) The object of this is to keep the bars in place when the machines are disconnected, and also when the machines are disconnected, to be used separately, it becomes necessary to sustain the bars C C', so that they will not be in the way when the machines are thus used. The bars can be thus sustained and the keys be operated, for, as stated, the connecting-bolts D pass therethrough without raising or having any effect on the keys. (See Fig. 14.) To thus raise the bars, strips J are placed on the out-turned ends of these large teeth $I^3$, as shown in Fig. 6, of sufficient width to raise the bars the desired distance, so that they will not interfere with the working of the keys, and then when the machines are connected again these strips J are removed. These transverse bars C C' of the two machines are connected by bars K, each bar K connecting the corresponding bars of the machines. The joints are made by suitable couplings, L, into which the ends of the bars fit. The bars K are preferably of the shape shown in Figs. 1 and 10, and beneath their raised portions are transverse key bars or levers M, to which they are connected by suitable rods or strings, N. (See Fig. 1.)

O represents a suitable frame which receives the back ends of the key bars or levers M, (see Figs. 2 and 3,) and P represents a bead or rib on the under side of the top of the frame, (see Fig. 3,) which fits in notches on the upper edges of the back ends of the key bars or levers, forming a pivot-bearing.

Q represent springs resting on the bottom of the frame O and supporting the key bars or levers M. The keys M are provided with finger-pieces M', which are lettered and marked the same as those of the machines, and thus it will be seen that each time one of these keys M is operated the corresponding keys of the two machines will be operated likewise by the connection made between them; and thus two machines are simultaneously operated by one operator, producing like manuscripts; and other bars may be connected to the bars C C' by means of couplings L', similar to those L, which would be connected to the keys of another set of machines, and thus more than two machines may be operated from or by the same set of keys, M. The keys M are guided and held in place by means of a comb, R, (see Figs. 2 and 9,) which rests upon the tops of the keys, and is held from side movement by pins R', projecting up from two of the keys M, or from the spacing-keys. (See Figs. 2 and 12.)

S represents spacing-keys, which have the connecting-bars S', and are connected to the spacing-keys of the machines in the same manner as the marking-keys.

The bars K are held in place and guided by combs T T, which are connected by ⊔-shaped bars U, hinged thereto. (See Figs. 2 and 8.) When the machines are connected these bars U are opened out, as shown in Figs. 2 and 4, and when the machines are to be disconnected these are turned under, (see Figs. 8 and 3,) pressing upon the keys M and raising the combs up tight against the bars K, thus supporting and holding them firmly in place when disconnected from the bars C C'.

The carriages of the two machines, or of all the machines, if more than two are used, are connected at the rear by a bar or rod, V, with slotted ends V', (see Fig. 2,) through which the set-screws of the bell-ringers of the Remington machines pass; or, if desired, the bar can be connected to the two carriages by special set-screws. The carriages are connected in front by bars or rods W W', one secured to each operating-lever of the carriages, and their adjacent ends connected by a set-screw, X, passing through slots in the bars or rods, these slots allowing for a slight adjustment of the carriages from or to each other, as may be required. One of these bars W W' is provided with a hand-lever, Y, for the purpose of raising or running the carriages back. Z is a pin secured to either one of the bars W W', and passing through the slot of the other to assist in holding the parts together.

I do not wish to confine myself to the exact details of construction shown, for the same may be changed.

I claim as my invention—

1. A plurality of type-writing machines connected to a single set of supplemental keys, substantially as and for the purpose set forth.

2. A plurality of type-writing machines removably connected to a single set of supplemental keys, substantially as and for the purpose set forth.

3. A plurality of type-writing machines connected to a single set of supplemental keys, M, by transverse bars C C', connected to the keys B B', and connecting-bars K, connected to the keys M, substantially as shown and described, for the purpose set forth.

4. A plurality of type-writing machines removably connected to a single set of supplemental keys, M, by means of bars K, connected to the keys M, and transverse bars C C', connected to the keys B B' by bolts D, which pass loosely through the bars and screw into the bottoms of the keys, substantially as and for the purpose set forth.

5. A plurality of type-writing machines connected to a single set of supplemental keys, M, by means of bars K, connected to the keys M, and transverse bars C C', connected to the keys B B' of the machines, in combination with guide-combs I I', secured to the sides of the machines, to guide the bars C C' and hold them in place, substantially as set forth.

6. A plurality of type-writing machines removably connected to a single set of supplemental keys, M, by means of bars K, connected to the keys M, and transverse bars C C', connected to the keys B B' of the machines, in combination with combs I I', with elongated teeth I², having out-turned ends I¹, and strips J, substantially as and for the purpose set forth.

7. In combination with a plurality of type-writing machines removably connected to a single set of supplemental keys, the blocks E E', hinged to the base-plates F F' and provided with feet or projections G G', substantially as and for the purpose set forth.

8. A plurality of type-writing machines connected to a single set of supplemental keys, M, in combination with comb R, to guide and hold in place the keys M, and itself held in place by pins R', substantially as and for the purpose set forth.

9. A plurality of type-writing machines removably connected to a single set of supplemental keys, M, by means of bars K and C C', in combination with combs T T, connected by means of ⊔-shaped bars U U, substantially as and for the purpose set forth.

HENRY ORPEN.

In presence of—
MAGGIE ORPEN,
GEO. H. KNIGHT.